W. A. SITTON.
Carriage Axle-Box.

No. 198,162.   Patented Dec. 11, 1877.

WITNESSES:
W. W. Hollingsworth
Solon C. Kemon

INVENTOR:
Wm. A. Sitton
BY
ATTORNEYS.

UNITED STATES PATENT OFFICE.

WILLIAM A. SITTON, OF CLEBURNE, TEXAS.

IMPROVEMENT IN CARRIAGE-AXLE BOXES.

Specification forming part of Letters Patent No. 198,162, dated December 11, 1877; application filed November 6, 1877.

*To all whom it may concern:*

Be it known that I, WILLIAM A. SITTON, of Cleburne, in the county of Johnson and State of Texas, have invented a new and useful Improvement in Carriage-Axle Boxes and Spindles; and I do hereby declare that the following is a full, clear, and exact description of the same.

The invention is an improvement in that class of axle boxes and spindles in which the spindles are provided with a rib or shoulder near their inner ends, and with detachable rings or washers, which are placed in contact with said rib or shoulder, to receive the wear.

The improvement consists in applying a slotted adjustable sleeve or box to the inner or shouldered end of the axle-journal, and a recessed nut and removable ring to the outer end thereof, whereby provision is made for compensating for the wear of the friction-surfaces of the journal and axle-box, as hereinafter described.

Figure 1:
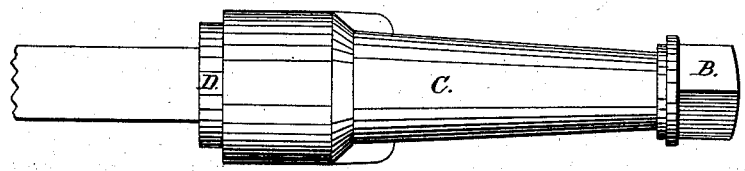
Figure 2:
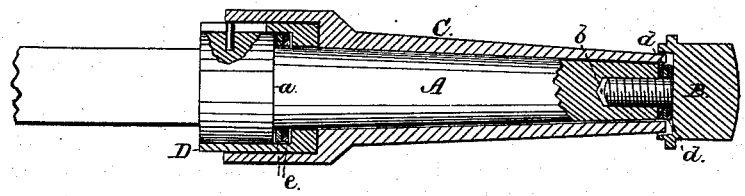
Figure 3:
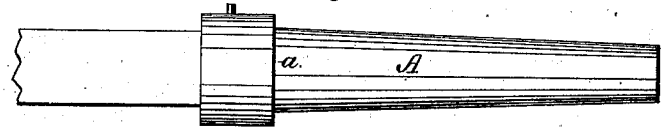
Figure 4:

In the accompanying drawing, forming part of this specification, Figures 1 and 2 are, respectively, an elevation and longitudinal section of my improved axle-spindle and its attachments. Fig. 3 is an elevation of the spindle; and Fig. 4 represents the slotted removable sleeve, designed to be applied to the shoulder of the spindle.

The axle-spindle A is tapered and provided with a shoulder, $a$, as usual. A screw-hole, $b$, is tapped in its outer end to receive the screw B, by which the axle-box C is held on the spindle. The squared head of the screw has an inner annular recess around the screw proper, in which are placed two or more metal rings or washers, $d$.

A detachable box or sleeve, D, is applied to the shouldered portion $a$ of the spindle, and is prevented from turning thereon by means of a stud which projects into a notch or open slot in the box. Two metal rings or washers, $e$, are placed on the spindle abutting its shoulder $a$.

It will be seen that the box C revolves with the wheel-hub around the spindle A, while the sleeve D and screw B remain fixed. The incidental wear is, therefore, between the axle-box and the spindle, the sleeve, and inner side of the screw-head D. In consequence of this wear, the axle-box will eventually become loose, or fail to fit the spindle properly. To remedy this defect it is necessary to adjust the box longitudinally on the spindle, and this is effected by removing the sleeve D and detaching one of the rings $e$, which practically increases the length of the wearing-surface of the spindle, since, on replacing the sleeve, its inner end will be nearer the shoulder $a$ to the extent of the thickness of the ring $e$ thus detached.

When the axle-box C is replaced, it will fit snugly on the spindle; but the end of the latter will project slightly beyond the contiguous end of the box. One of the rings $d$, therefore, requires to be detached in order to form a space to receive the end of the spindle and allow the screw-head B to fit against the end of the box, which being done the box will fit as snugly, and be secured in the same manner as before.

In case of necessity, all the rings $d$ and $e$ may be detached.

I am aware a threaded sleeve has been applied to a shouldered axle-spindle to hold a hub thereon, and that removable rings have been employed to take the wear caused by endwise thrust of the hub, and I do not claim such combination.

What I claim is—

The spindle having the shoulder $a$ and a screw-hole tapped in its outer end, the screw B, having an annular recess around its threaded part, the detachable rings $d\ d$ and $e\ e$, and the sleeve D, provided with a flange on its inner end and a slot in its outer end, to receive the stud fixed in the spindle-shoulder, whereby it is prevented from revolving with the hub, all combined, as shown and described.

The above specification of my invention signed by me this 12th day of September, 1877.

WILLIAM A. SITTON.

Witnesses:
JNO. B. HUDSON,
PHIL. T. ALLIN.